Feb. 23, 1960  M. A. REMKE  2,926,049
BEARING
Filed Dec. 31, 1956  3 Sheets-Sheet 1

INVENTOR.
M. A. REMKE

BY Hudson & Young

ATTORNEYS

Feb. 23, 1960 M. A. REMKE 2,926,049
BEARING
Filed Dec. 31, 1956 3 Sheets-Sheet 2
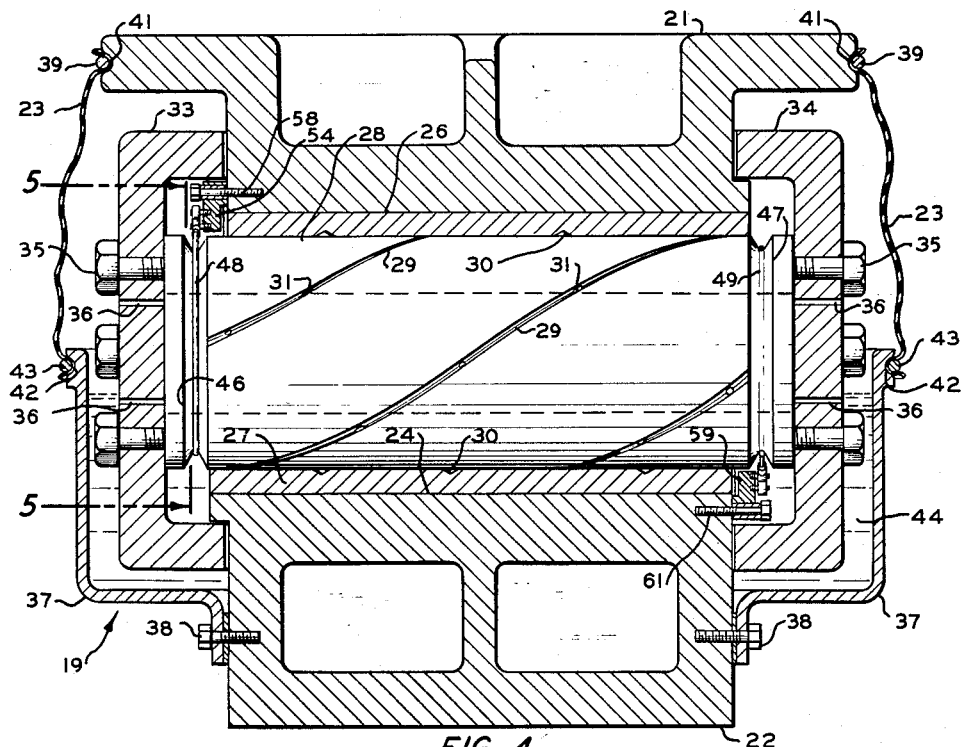
FIG. 4
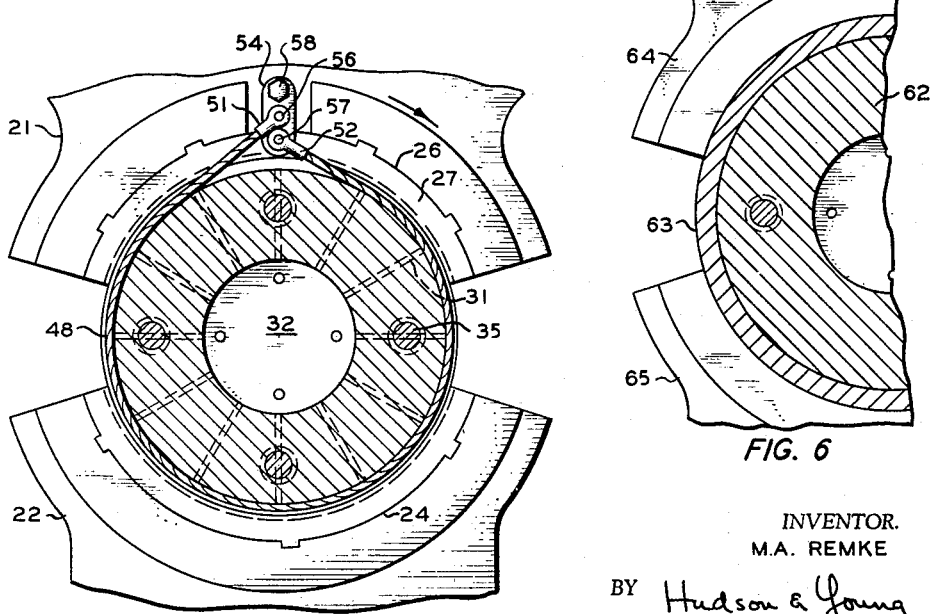
FIG. 5
FIG. 6
INVENTOR.
M.A. REMKE
BY Hudson & Young
ATTORNEYS INVENTOR.
M. A. REMKE
BY Hudson & Young
ATTORNEYS United States Patent Office 2,926,049
Patented Feb. 23, 1960

2,926,049
BEARING

Marvin A. Remke, Bartlesville, Okla., assignor to Phillips Petroleum Company, a corporation of Delaware Application December 31, 1956, Serial No. 631,808
12 Claims. (Cl. 308—21)

This invention relates to a bearing for members having oscillating movement. In particular, it relates to a center bearing adapted to be mounted on the walking beam of an oil well pumping unit, or other slowly moving oscillating load.

Although my invention finds particular application in combination with oil well walking beam pumping units, and is described hereafter as applying to such pumping units merely for illustrative purposes, it is not limited thereto but can be used in combination with any slowly moving oscillating load.

Accordingly, an object of this invention is to provide an improved bearing for a slow moving oscillating load.

Another object is to provide an improved center bearing for use in combination with oil well walking beam pumping units.

Another object is to provide an improved bearing characterized by its ease of replacement.

Another object is to provide an improved bearing having a floating shaft which is rotatable between stationary and oscillating members, whereby the wear between the relative moving members is evenly distributed.

A further object is to provide a bearing having a shaft which is completely enclosed by a flexible dust seal, thus eliminating the necessity for rotatable lubricant seals.

A still further object is to provide an improved bearing having a novel lubricating means associated therewith.

Further objects and advantages of my invention will become apparent to those skilled in the art from the following discussion, appended claims, and accompanying drawing in which:

Figure 4 is an elevational view in partial cross-section of Figure 3;

Figure 5 is a partial cross-sectional view of Figure 4 taken along the plane indicated;

Figure 6 is a partial cross-sectional view similar to that of Figure 5, illustrating a further embodiment of my invention.

Figure 1:
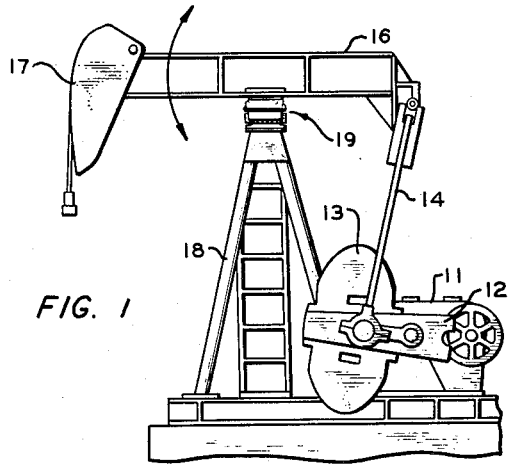
Figure 1 is a diagrammatic view of one type of oil well pumping unit embodying my invention.
Figure 2:
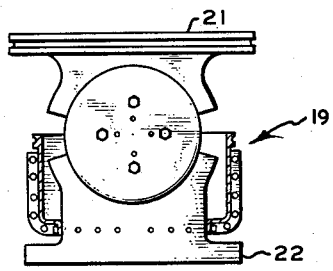
Figure 2 is an enlarged end view of the bearing shown in Figure 1 in partial cross-section.

Referring to the drawing now, in which like reference characters have been used to designate like parts, and to Figure 1 in particular, one type of walking beam pumping unit is shown illustrating the application of my invention in combination with a slow moving oscillating load. The pumping unit comprises a gear housing 11, which can be actuated by an internal combustion engine or the like, a counterbalanced crank 12, counterweight 13, and pitman 14, which members transmit motive power to oscillate walking beam 16 having a horsehead 17. Surmounting the top of a Samson post 18 is a center bearing generally designated 19, upon which the walking beam 16 is mounted. As shown in the enlarged views of Figures 2 and 3, the center bearing comprises an oscillating member or saddle 21 and a stationary member or base 22, between which members a floating shaft (not shown in these figures) is positioned. Completely enclosing the shaft is a flexible dust seal 23.

The detailed construction of the center bearing 19 is shown in Figures 4 and 5. The upper inner portion of base 22 and the lower inner portion of saddle 21 have concave surfaces 24, 26, respectively, which surfaces are provided with longitudinal keyways so as to receive a cylindrical bushing 27. A cylindrical floating shaft 28 is positioned in the bushing 27, the ends of which shaft extend therefrom. The exterior surface of the shaft 28 is provided with spiral grooves 29 which cooperate with spiral grooves 30 on the interior surface of bushing 27. Grooves 29 and 30 can be spiraled in the same direction, as shown clearly in Figure 7, but preferably are spiraled in opposite directions. The shaft grooves 29 are provided with radial bores 31 which communicate with the hollow 32 in shaft 28. Mounted on the ends of the shaft 28 are caps 33, 34, which are secured to the respective ends of the shaft 28 by bolts 35. Caps 33, 34 are provided with longitudinal passages 36 which communicate at their inner ends with the hollow 32 of shaft 28. Surrounding the exterior lower portions of caps 33, 34, and the upper portion of base 22 is an oil reservoir container 37 which is secured at its lower end to base 22 by means of bolts 38. The flexible seal 23 (which can desirably accommodate changes in the enclosed volume of air and lubricant occasioned by changes in ambient temperature) surrounds the exterior upper portion of caps 33, 34; the upper end of seal 23 is secured to the periphery of saddle 21 by means of a band 39 which is adapted to clamp the upper end of seal 23 in a peripheral groove 41 provided in saddle 21. The lower end of seal 23 (which can be made of oil-resistant and reinforced rubber) is similarly clamped to a peripheral groove 42 provided in the upper end of oil container 37 by a band 43. In this manner, the shaft 28 is completely enclosed by oil container 37 and flexible seal 23. A supply of oil 44 is contained in the space between the interior wall of oil container 37 and the exterior wall of caps 33, 34. This oil supply can flow through passages 36 in caps 33, 34, into the hollow 32 of shaft 28 and thence through the radial bores 31 to uniformly distribute lubricant over the bearing surfaces.

The outer surfaces of shaft 28 which protrude from the bushing 27 are provided with annular grooves 46, 47. Positioned in annular grooves 46, 47 are clutch cables 48, 49, respectively, the detail of clutch cable 48 being shown clearly in Figure 5. The ends of clutch cable 48 are fitted with connector rings 51 and 52 which are in turn fastened to a pivotal member 54 by means of pins 56, 57, respectively. Connector ring 51 is fastened to an intermediate portion of pivotal member 54 and connector ring 52 is fitted to the lower or inner extremity of pivotal member 54. Pivotal member 54 is pivotally secured to saddle 21 by means of a bolt 58. The ends of clutch cable 49 are similarly secured to a pivotal member 59 which is in turn pivotally secured to base 22 by bolt 61.

Referring now to Figure 6, a cross-sectional view is shown of a center bearing similar to that of Figures 4 and 5 but the clutch means have not been illustrated in this figure for purposes of simplicity. The shaft 62 is positioned in an oil impregnated bushing 63, and is secured thereto by suitable keying means similar to the manner in which concave surfaces 24, 26 are keyed to receive the bushing 27 of Figure 5 but with bushing 63 keyed to shaft 62 for rotation therewith; alternatively, bushing 63 can be shrunk onto shaft 62, as shown in Figure 6. As such, the bearing surfaces of shaft 62, saddle 64, and base 66 are lubricated by bushing 63 and this center bearing is not provided with the oil container of Figure 4. A flexible dust seal (not shown) can be positioned to completely enclose the shaft 62 by having the upper end of the seal attached to saddle 64 and the lower end of the seal attached to the base 63 by suitable bands in a manner similar to that of Figure 4.

Figure 3:
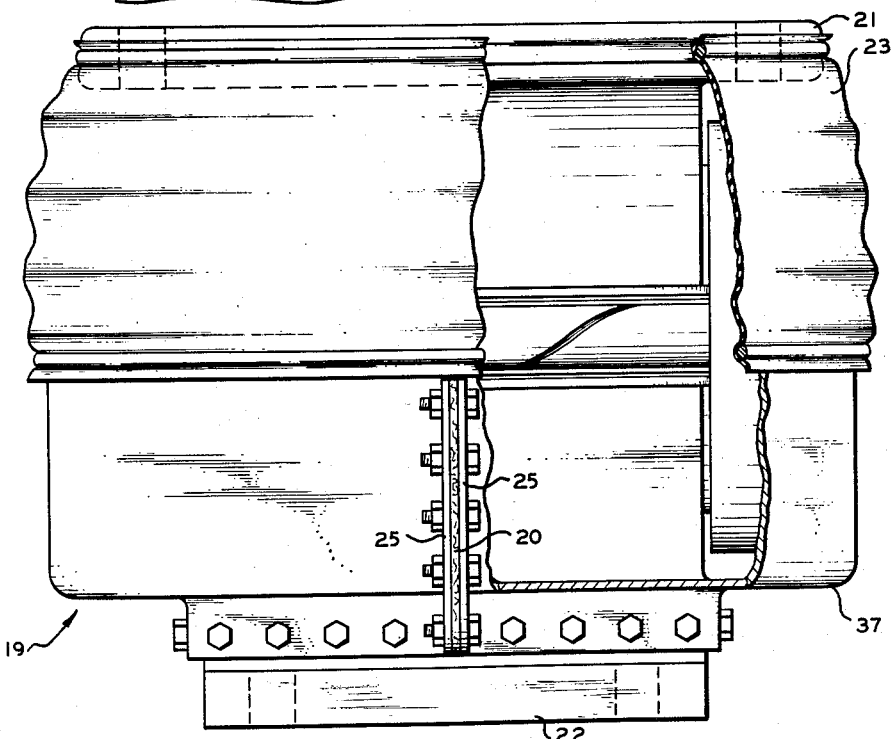
Figure 3 is an enlarged elevational view of the bearing shown in Figure 1 with a portion broken away.

The configuration of the flexible dust seal 23 and the oil container 37 is shown clearly in Figure 3. The oil container 37 can be made in two parts having adjacent flange 25 bolted together with a suitable gasket 20 positioned therebetween.

Figure 7:
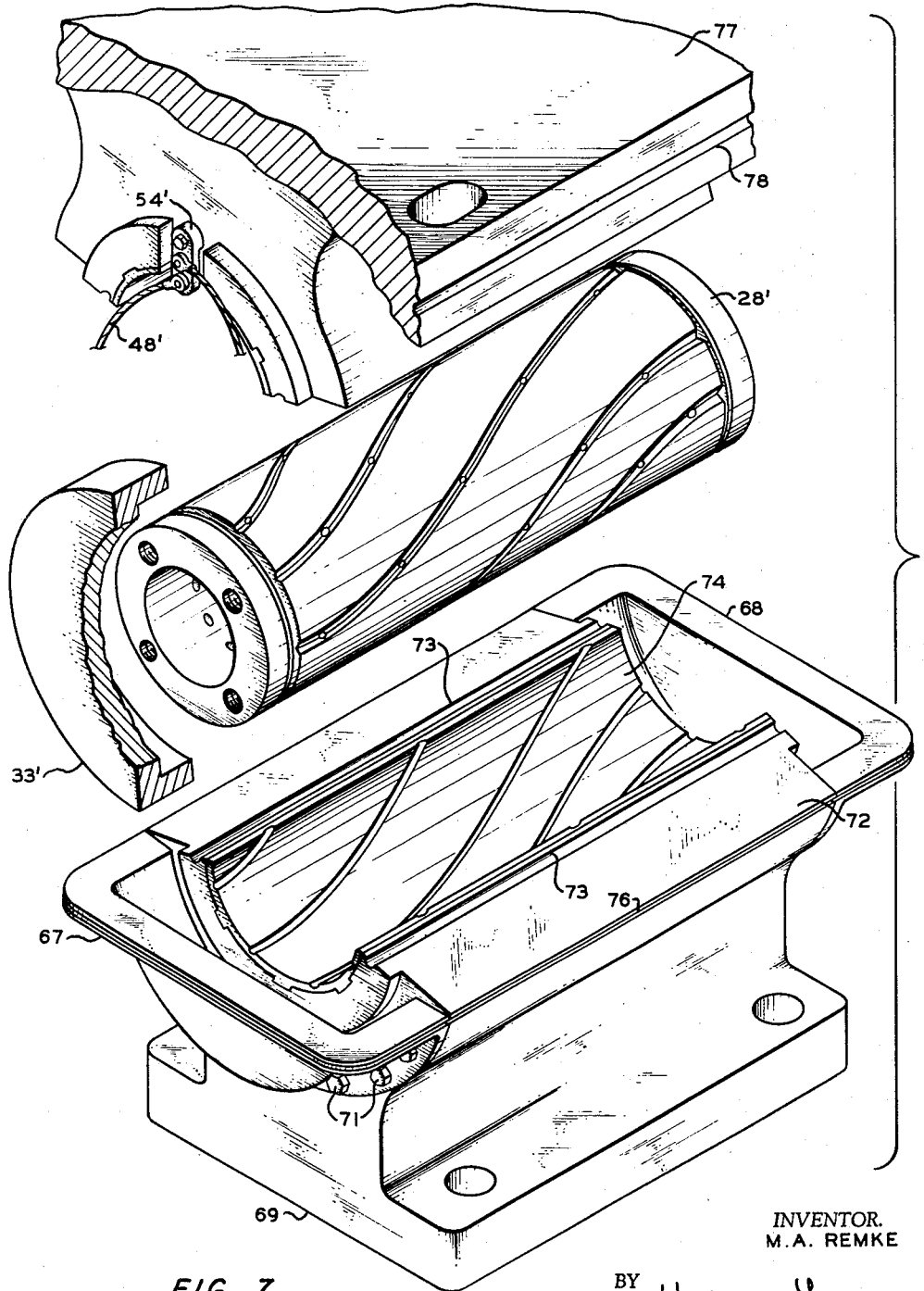
Figure 7 is an exploded view of Figure 4 with certain parts broken away.

Referring now to the exploded view of Figure 7, a further embodiment of my invention is shown wherein cap members 67 and 68 are secured to the base 69 by bolts 71. The inclined upper surface 72 of base 69 is provided with a pair of longitudinal grooves 73, adjacent the bushing 74. The outer peripheries of caps 67, 68 and base 69 is provided with a common groove 76 and saddle 77 with a groove 78 whereby a flexible dust seal (not shown) can be suitably secured as hereinbefore described.

The operation of the bearings described is briefly as follows, illustrative reference being made to Figures 1–5. The oscillation of the walking beam 16 causes a corresponding oscillation of the saddle member 21 which is secured thereto. Oscillation of the saddle 21 in the direction indicated moves the pivotal member 54 in the same direction and causes the clutch cable 48 to seize the shaft 28 and turn it in the same direction as indicated. Corresponding oscillation in the opposite direction to that indicated causes the peripheral member 54 to move in the corresponding opposite direction and causes the clutch cable 48 to loosen, whereby the shaft 28 remains stationary. Thus, it may be seen that as the saddle 21 oscillates first to the right and then to the left, the floating shaft 28 will be rotated to the right only. If, for example, the saddle 21 oscillates through a 40° arc, it will require nine oscillating cycles to turn the shaft 28 one complete revolution. To prevent the shaft 28 from returning (or turning to the left) the clutch cable 49 which is attached at the opposite end of the shaft 28 to the base 22 is made to act in a direction opposite the clutch cable 48.

Since the base and saddle members of my novel bearings are separable, that is, form a "split-housing," the floating shaft can be easily replaced. This can be accomplished by providing the upper portion of the Samson post with the suitable jack screws to support the walking beam, in a manner known in the prior art, while replacing the floating shaft. Removal of the floating shaft can then be effected merely by taking off the cap member enclosing both ends of the shaft and then sliding the shaft out from its housing.

Because the floating shaft rotates with the oscillating load, as described hereinbefore, the wear is evenly distributed over the entire bearing surfaces, and the novel lubricating means of my invention ensures the presence of lubricant over all of these surfaces. As such, replacement of the shaft due to excessive wear will be minimized.

The ingress of dust, sand, or other foreign materials between bearing surfaces, such as between the shaft and the bearing, will be prevented by the flexible dust seal, made, for example, from rubbery material, which completely encloses the shaft and which is not subject to wear as are conventional rotated lubricant seals. Because the ingress of foreign material is prevented, the wear of the bearing surfaces is minimized all the more.

Various modifications of my invention will become apparent to those skilled in the art without departing from the scope or spirit of my invention, and it is to be understood that the foregoing description and accompanying drawing merely illustrate preferred embodiments of my invention.

I claim:

1. A bearing for an oscillating load comprising, in combination, an oscillating load-bearing member, a stationary base member, said members interiorly provided with concave lower and upper surfaces respectively, a rotatable floating shaft having an external bearing surface and disposed between said concave surfaces, said shaft having an axial bore, an oil reservoir in communication with said bore and said bearing surface of said shaft, and a pair of clutch means each operatively secured to one end of said shaft, one clutch means connected to said load-bearing member and the other clutch means connected to said base member, said clutch members adapted to unidirectionally rotate said shaft upon oscillation of said load-bearing member.

2. A bearing for a reciprocating load comprising, in combination, a reciprocating load-bearing member, a stationary base member, said members interiorly provided with concave lower and upper surfaces respectively, a rotatable floating shaft having an external bearing surface and disposed between said concave surfaces, said shaft having an axial bore, an oil reservoir in communication with said bore and said bearing surface of said shaft, and clutch members oppositely wound around both ends of said shaft, one clutch member connected to said load-bearing member and the other clutch member connected to said base member, said clutch members adapted to unidirectionally rotate said shaft upon reciprocation of said load-bearing member.

3. A bearing for an oscillating load comprising, in combination, an oscillating load-bearing member, a stationary base member, said members interiorly provided with concave lower and upper surfaces respectively, concave bushing segments disposed between said members and in keyed engagement with said concave surfaces, a rotatable floating shaft partially encircled by said bushing segments and rotatably disposed therein, means for ensuring the lubrication of the bearing surfaces between said bushing and said shaft including an axial bore in said shaft communicating with said bearing surfaces, a lubricant reservoir exteriorly mounted on said base member and communicating with said axial bore, and clutch members oppositely wound around both ends of said shaft, one clutch member connected to said load-bearing member and the other clutch member connected to said base member, said clutch members adapted to unidirectionally rotate said shaft upon oscillation of said load-bearing member.

4. A bearing for an oscillating load comprising, in combination, an oscillating load-bearing member, a stationary base member, said members interiorly provided with concave lower and upper surfaces respectively, concave bushing segments disposed between said members and in keyed engagement with said concave surfaces, a rotatable floating shaft partially encircled by said bushing segments and rotatably disposed therein, means for ensuring the lubrication of the bearing surfaces between said bushing segments and said shaft including an axial bore in said shaft communicating with said bearing surfaces, cap members enclosing both ends of said shaft which protrude from said concave surfaces of said load-bearing and base members, said cap members rotatably secured to said shaft and having passages which communicate with said axial bore, a lubricant reservoir exteriorly mounted on said base member and communicating with said passages, a dust seal operatively mounted on said load-bearing and base members and completely enclosing said shaft, and clutch members oppositely wound around both ends of said shaft, one clutch member connected to said load-bearing member and the other clutch member connected to said base member, said clutch members adapted to unidirectionally rotate said shaft upon oscillation of said load bearing member.

5. A bearing for an oscillating load comprising, in combination, an oscillating load-bearing member, a stationary base member, said members interiorly provided with concave lower and upper surfaces respectively, concave bushing segments disposed between said members and in keyed engagement with said concave surfaces, a rotatable floating shaft partially encircled by said bushing segments and rotatably disposed therein, means for ensuring the lubrication of the bearing surfaces between said bushing segments and said shaft including an axial bore in said shaft communicating with said bearing surfaces, cap members enclosing both ends of said shaft which protrude from said concave surfaces of said load-bearing and base members, said cap members rotatably secured to said shaft and having passages which communicate with said axial bore, a lubricant reservoir exteriorly mounted on said base member and communicating with said passages, a flexible dust seal mounted at its lower end on said lubricant reservoir and at its upper end on said load-bearing member, said dust seal completely enclosing said shaft and adapted to accommodate volume changes of the enclosed lubricant and air occasioned by changes in ambient temperature, and clutch members oppositely wound around both ends of said shaft, one clutch member connected to said load-bearing member and the other clutch member connected to said base member, said clutch members adapted to unidirectionally rotate said shaft upon oscillation of said load-bearing member.

6. In a well pumping apparatus including a power unit, an oscillating beam member, a pitman connection between said power unit and said beam member, a Samson post for said beam, and a bearing surmounting said post and connected to said beam, said bearing comprising, in combination, an oscillating load-bearing member, a stationary base member, a floating shaft disposed between said members, said shaft being provided with a pair of annular grooves, each of the latter disposed in the outer cylindrical surface of said shaft adjacent one end thereof, and a pair of similar clutch means, each of said clutch means comprising a clutch cable, one of said clutch cables being positioned in one of said grooves and fastened at its ends to said load-bearing member and the other of said clutch cable being positioned in the other of said grooves and secured at its ends to said base member, said clutch members adapted to unidirectionally rotate said shaft upon oscillation of said bearing member.

7. In a well pumping apparatus including a power unit, an oscillating beam member, a pitman connection between said power unit and said beam, a Samson post for said beam, and a bearing surmounting said post and connected to said beam, said bearing comprising, in combination, an oscillating load-bearing member, a stationary base member, said members interiorly provided with concave lower and upper surfaces respectively, a rotatable floating shaft having an exterior bearing surface and disposed between said concave surfaces, said shaft having an axial bore, an oil reservoir in communication with said bore and said bearing surface of said shaft, and clutch members oppositely wound around both ends of said shaft, one clutch member connected to said load-bearing member and the other clutch member connected to said base member, said clutch members adapted to unidirectionally rotate said shaft upon oscillation of said load-bearing member.

8. A bearing for an oscillating load comprising, in combination, an oscillating load-bearing member, a stationary base member, said members interiorly provided with concave lower and upper surfaces respectively, a lubricant-impregnated cylindrical bushing disposed between said members, a rotatable floating shaft encircled by said bushing and rotatably disposed therein, and clutch members oppositely wound around both ends of said shaft, one clutch member connected to said load-bearing member and the other clutch member connected to said base member, said clutch members adapted to unidirectionally rotate said shaft upon oscillation of said load-bearing member.

9. A bearing for an oscillating load comprising, in combination, an oscillating load-bearing member, a stationary base member, said members interiorly provided with concave lower and upper surfaces respectively, a lubricant-impregnated cylindrical bushing disposed between said members, a rotatable floating shaft encircled by said bushing and rotatably disposed therein, a dust seal operatively mounted on said load-bearing and base members and completely enclosing said shaft, and clutch members oppositely wound around both ends of said shaft, one clutch member connected to said load-bearing member and the other clutch member connected to said base member, said clutch members adapted to unidirectionally rotate said shaft upon oscillation of said load-bearing member.

10. A bearing for an oscillating load comprising, in combination, an oscillating load-bearing member, a stationary base member, said members interiorly provided with concave lower and upper surfaces respectively, said base member having inclined upper surfaces, concave bushing segments disposed between said members and in keyed engagement with said concave surfaces, a rotatable floating shaft partially encircled by said bushing segments and rotatably disposed therein, means for ensuring the lubrication of the bearing surfaces between said bushing segments and said shaft including an axial bore in said shaft communicating with said bearing surfaces, a lubricant groove in each of said inclined upper surfaces of said base member, said grooves adjacent the lower of said bushing segments, lubricant reservoirs exteriorly mounted on each end of said base member and communicating with said grooves and said axial bore, and clutch members oppositely wound around both ends of said shaft, one clutch member connected to said load-bearing member and the other clutch member connected to said base member, said clutch members adapted to unidirectionally rotate said shaft upon oscillation of said load-bearing member.

11. In a well pumping apparatus including a power unit, an oscillating beam member, a pitman connection between said power unit and said beam member, a Samson post for said beam, and a bearing surmounting said post and connected to said beam, said bearing comprising, in combination, an oscillating load-bearing member, a stationary base member, a floating shaft disposed between said members, a pair of similar clutch means each operatively secured to one end of said shaft, one clutch means connected to said load-bearing member and the other clutch means connected to said base member, said clutch members adapted to unidirectionally rotate said shaft upon oscillation of said bearing member, and a flexible dust seal mounted at its lower end to said base member and mounted at its upper end to said load-bearing member, said dust seal completely enclosing said shaft and adapted to accommodate volume changes in the resulting enclosed space occasioned by changes in ambient temperature.

12. In a well pumping apparatus according to claim 11 wherein said shaft is provided with a pair of annular grooves, each of the latter disposed in the outer cylindrical surface of said shaft adjacent one end thereof, each of said clutch means comprising a clutch cable, one of said clutch cables being fastened at its ends to said load-bearing member and the other of said clutch cables secured at its ends to said base member.

References Cited in the file of this patent
UNITED STATES PATENTS

| | | |
|---|---|---|
| 1,568,318 | Carlson | Jan. 5, 1926 |
| 2,158,161 | Trout | May 16, 1939 |

FOREIGN PATENTS

| | | |
|---|---|---|
| 50,621 | Norway | Nov. 21, 1930 |